US007833125B2

(12) United States Patent
Carlhammar et al.

(10) Patent No.: US 7,833,125 B2
(45) Date of Patent: Nov. 16, 2010

(54) HYBRID POWERTRAIN AND A METHOD FOR CONTROLLING A HYBRID POWERTRAIN

(75) Inventors: Lars Carlhammar, Lindome (SE); Benny Carlsson, Alingsäs (SE)

(73) Assignee: Volvo Technology Corporation, Göteborg (SE)

( * ) Notice: Subject to any disclaimer, the term of this patent is extended or adjusted under 35 U.S.C. 154(b) by 310 days.

(21) Appl. No.: 12/279,867

(22) PCT Filed: Mar. 9, 2007

(86) PCT No.: PCT/SE2007/000227

§ 371 (c)(1), (2), (4) Date: Aug. 19, 2008

(87) PCT Pub. No.: WO2007/102775

PCT Pub. Date: Sep. 13, 2007

(65) Prior Publication Data
US 2009/0239703 A1  Sep. 24, 2009

(51) Int. Cl.
*B60K 1/02* (2006.01)
(52) U.S. Cl. .......................................................... 477/3
(58) Field of Classification Search ...................... 477/3; 180/65.25
See application file for complete search history.

(56) References Cited
U.S. PATENT DOCUMENTS
5,713,425 A   2/1998  Buschhaus et al.

6,656,082 B1 * 12/2003 Yamada et al. ................. 477/5
7,223,201 B2 *  5/2007 Colvin et al. .................. 477/5
2003/0069103 A1 *  4/2003 Ibamoto et al. ................ 475/5

FOREIGN PATENT DOCUMENTS
WO           9715979 A1   5/1997
WO        2005016681 A1   2/2005

OTHER PUBLICATIONS

International Search Report for corresponding International Application PCT/SE2007/000227.
International Preliminary Report on Patentability for corresponding International Application PCT/SE2007/000227.

* cited by examiner

*Primary Examiner*—Dirk Wright
(74) *Attorney, Agent, or Firm*—WRB-IP LLP

(57) ABSTRACT

A hybrid powertrain includes a combustion engine operable to output rotational power thereat, an electric machine arrangement operable to output rotational power thereat, a gearbox arrangement for receiving rotational power from at least one of the combustion engine and the electric machine arrangement and being operable to couple motive power to a load coupled to the gearbox arrangement. The gearbox arrangement is operable to provide a plurality of gearing ratios. The electric machine arrangement is employable to extend a rotation rate range provided in a given gearing ratio: at higher rotation rates prior to a gear change from said given gearing ratio to a gearing ratio subsequent thereto; or at both lower rotation rates when accelerating from a standstill or from a preceding gear, and at higher rotation rates prior to a gear change from said given gearing ratio to a gearing ratio subsequent thereto.

42 Claims, 3 Drawing Sheets

HYBRID POWERTRAIN AND A METHOD FOR CONTROLLING A HYBRID POWERTRAIN

BACKGROUND AND SUMMARY

The present invention relates to hybrid powertrains for systems, for example for passenger vehicles, buses, trucks, boats, ships, trams, trains and similar. Moreover, the invention also concerns methods of controlling such powertrains, for example with regard to gear change. Furthermore, the present invention also relates to vehicles and similar including such powertrains. Additionally, the present invention relates to software executable on computing hardware for executing the methods of controlling such powertrains.

In recent years, considerable research has been invested in hybrid system technology in order to provide enhanced fuel economy as well as improved motive performance. Hybrid systems include hybrid powertrains, wherein each powertrain usually comprises a combustion engine, an electric machine arrangement, an electrical storage element and a transmission arrangement for coupling at least the electric machine arrangement to a load of the system. The electric machine is optionally implemented as a motor/generator. Superficially, such hybrid powertrains would seem to involve additional complexity and potentially added weight which would be deleterious to system performance. However, in practice several benefits arise from employing hybrid powertrains in comparison to conventional simple combustion engine systems which operate sub-optimally, especially in stop-start scenarios.

One considerable benefit provided by hybrid powertrains is rapid acceleration of a corresponding vehicle from standstill. Such rapid acceleration is achievable on account of electric motors being capable of developing relatively high starting torques, for example in the order of 1000 Nm, at low motor rotor rotation rates. Moreover, rechargeable batteries of hybrid power trains are capable of delivering enormous peak powers of several ten's or even hundred's of kiloWatts. In regard to vehicles equipped with such hybrid powertrains it is conventional contemporary practice to employ combustion engines in such hybrid powertrains to propel the vehicles when higher vehicle speeds have been attained whereat electric motors are not capable of providing any advantage. For example, combustion engines of hybrid powertrains are primarily used to provide motive power when their vehicles are cruising at high speeds on motorways. In urban traffic wherein frequent stop-start cycles are experienced, electric motors of hybrid powertrains are used to a considerable extent.

In a published international PCT patent application no. WO 97/15979, there is described a hybrid drive for a motor vehicle including an internal combustion engine coupled at its rotational output shaft via a clutch to an electric motor. The electric motor is, in turn, connected via a bridging coupling to an automatic gearbox and subsequently therethrough to wheels of the vehicle. The hybrid drive is alleged in the published application to improve considerably traveling comfort. By summing the rotational power developed by the combustion engine and the electric motor, it is alleged to be able to reduce a number of switching processes required in the hybrid drive during operation.

In a published U.S. Pat. No. 5,713,425, there is described a hybrid powertrain for an automotive vehicle. The powertrain comprises an internal combustion engine and transmission assembly providing a first selectable shiftable geared torque flow path to traction wheels of the vehicle. Moreover, the powertrain also comprises an electric motor-generator unit defining a second geared torque flow path that is located between the output of the first geared torque flow path and the aforesaid traction wheels. A control system is further included in the hybrid powertrain for operating the electric motor-generator unit to supply torque to the traction wheels while the torque flow in the first torque flow path is interrupted during the occurrence of a gear ratio change in the transmission assembly and during disengagement of a clutch. By way of interactive control of the internal combustion engine and the electric motor-generator unit, drivability of the vehicle is enhanced and engine exhaust gas emissions can be reduced. Additionally, the electric motor-generator can launch to vehicle into motion immediately in response to a request from an operator of the vehicle. During electric launch of the vehicle into motion, the interactive control of the combustion engine and the motor-generator permits the combustion engine to be restarted and then gradually take over a task of propelling the vehicle from the motor-generator unit.

In a published international PCT patent application no. WO2005/016681, there is described a method of controlling a drive unit of a motor vehicle. The drive unit comprises an internal combustion engine and an electric motor. A main transmission arrangement of the drive unit includes an output shaft that is rotationally coupled to a drive shaft of the motor vehicle. The transmission arrangement further includes an input shaft which is connected to the internal combustion engine. The electric motor is coupled to the input shaft or to the output shaft of the transmission arrangement via an intermediate transmission encompassing at least two transmission steps.

In operation, the vehicle is initially driven exclusively by the electric motor in order to accelerate the vehicle from a standstill coincident with the intermediate transmission being on its lowest transmission step. The combustion engine takes over the driving function prior to a shifting process of the intermediate transmission. The intermediate transmission is optionally implemented as a dog-clutch transmission.

The drive unit described in the aforementioned PCT application is well adapted for passenger cars operable to transport people seated within the cars.

The inventor has appreciated that such a manner of operation of the drive unit is suitable for vehicles such as passenger cars, but is sub-optimal for larger vehicles such as buses and trucks, especially when such buses and trucks are used in dense traffic in urban environments wherein frequent stop-start cycles are encountered. Moreover, in crowded buses, people are often standing on account of a lack of seating capacity which places further constraints that acceleration and deceleration of the crowded buses must be smooth and uniform without periods of loss of transmission power propelling the crowded buses. Such smooth transmission characteristics are obtained in contemporary hybrid powertrains in vehicles by using electric motors to initially provide acceleration of the vehicles and then invoking torque from combustion engines once the vehicles have attained appreciable speed prior to invoking a sequence of gear changes. However, the inventor has found that such contemporary hybrid powertrains are not capable of providing sufficiently smooth and uniform acceleration and deceleration.

Thus, the present invention is concerned with addressing a problem that contemporary powertrains are not capable of providing a sufficiently smooth and uniform acceleration.

It is desirable to provide an improved hybrid powertrain which is capable of providing more smooth and uniform acceleration, and correspondingly more smooth and uniform deceleration.

According to a first aspect of the invention, there is provided a hybrid powertrain including:

a combustion engine operable to output rotational power thereat;

an electric machine arrangement operable to output rotational power thereat;

a gearbox arrangement for receiving rotational power from at least one of the combustion engine and the electric machine arrangement, the gearbox arrangement being operable to couple corresponding motive power to a load;

a control unit arrangement coupled in communication with the combustion engine, with the electric machine arrangement and with the gearbox arrangement for coordinating their operation;

wherein the gearbox arrangement is operable to provide a plurality of gearing ratios;

characterized in that the electric machine arrangement (60) is employable to extend a rotation rate range provided in a given gearing ratio at higher rotation rates prior to a gear change from the given gearing ratio to a gearing ratio subsequent thereto.

The invention is of advantage in that use of the electric machine arrangement to extend a range of rotation rates employable in at least the first gearing ratio is capable of reducing a frequency of gear changes, thereby providing for smoother and more uniform acceleration, and also smoother and more uniform deceleration. Such uniform deceleration is beneficially implemented as regenerative braking.

Optionally, in the hybrid powertrain, the electric machine arrangement is also employable to extend a rotation rate range provided in a given gearing ratio at both lower rotation rates when accelerating from a standstill or from a preceding gear.

There is also provided a hybrid powertrain including:

a combustion engine operable to output rotational power thereat;

an electric machine arrangement operable to output rotational power thereat;

a gearbox arrangement for receiving rotational power from at least one of the combustion engine and the electric machine arrangement, the gearbox arrangement being operable to couple corresponding motive power to a load;

a control unit arrangement coupled in communication with the combustion engine, with the electric machine arrangement and with the gearbox arrangement for coordinating their operation;

wherein the gearbox arrangement (200) is operable to provide a plurality of gearing ratios;

characterized in that the electric machine arrangement (60) is employable to extend a rotation rate range provided in a subsequent gearing ratio at higher rotation rates after a gear change from a given gearing ratio to the gearing ratio subsequent thereto.

The present invention is beneficial during acceleration as well as during deceleration, for example when implementing regenerative braking to convert kinetic energy into electrical energy for storage in an energy storage arrangement.

The electric machine arrangement is beneficially couplable to an energy storage arrangement for providing electrical power to the electric machine arrangement in operation.

The powertrain is beneficially provided with a control arrangement for controlling operation of the powertrain. Further, the powertrain is beneficially provided with a coupling arrangement operable to couple rotational power between the combustion engine and the electric machine arrangement.

Preferably, in the powertrain, the coupling arrangement of the powertrain is operable to at least partially decouple the combustion engine from the gearbox arrangement at the higher rotation rates. More preferably, in the powertrain, the coupling arrangement is operable to fully decouple the combustion engine from the gearbox arrangement at the higher rotation rates. At least partly decoupling the combustion engine reduces a risk of damaging the engine by over-revving it and also is susceptible to reducing friction in the powertrain, thereby improving its efficiency.

Preferably, in the powertrain, the combustion engine is operable in each of the gearing ratios to deliver its maximum power at substantially a middle portion of the rotation range of the gearing ratio, with the electric machine arrangement providing its maximum towards lower and upper rotation rate limits of the gearing ratio. Such use of the electric machine arrangement at both rotation rate-limits of a given gearing ratio is in contradistinction to contemporary practice whereat power delivered from a combustion engine is normally used at relative higher rotation rates in the given gearing ratio.

More preferably, in the powertrain, the middle portion of the rotation range corresponds to an output shaft of the combustion engine rotating at rate in a range of substantially 1500 rpm to 3000 rpm, the lower rotation rate corresponds to an output shaft of the electric machine arrangement rotating at a rate in a range of 0 rpm to 1500 rpm, and the upper rotation rate corresponds to the output shaft of the electric machine arrangement rotating at a rate in a range of substantially 3000 rpm to at least 4500 rpm. Optionally, the lower rotation rate corresponds to the output shaft of the electric machine arrangement rotating in a range of 1000 rpm to 1500 rpm when the powertrain is already in motion.

According to a second aspect of the invention, there is provided a method of controlling a hybrid powertrain including:

a combustion engine operable to output rotational power thereat;

an electric machine arrangement operable to output rotational power thereat;

a gearbox arrangement for receiving rotational power from at least one of the combustion engine and the electric machine arrangement, the gearbox arrangement being operable to couple corresponding motive power to a load;

a control unit arrangement coupled in communication with the combustion engine, with the electric machine arrangement and with the gearbox arrangement for coordinating their operation;

wherein the gearbox arrangement is operable to provide a plurality of gearing ratios, characterized in that the method including steps of:

(a) employing the electric machine arrangement to extend a rotation rate range provided in a given gearing ratio at lower rotation rates when accelerating from a standstill or a preceding gearing ratio, and to extend a rotation rate range provided in the given gearing ratio at higher rotation rates prior to a gear change from the given gearing ratio to a gearing ratio subsequent thereto; or (b) employing the electric machine arrangement to extend a rotation rate range provided in the given gearing ratio at higher rotation rates prior to a gear change from the given gearing ratio to a gearing ratio subsequent thereto.

Preferably, the method includes a step of using a coupling arrangement of the powertrain to at least partially decouple the combustion engine from the gearbox arrangement at the higher rotation rates. More preferably, in the method, the coupling arrangement is operable to fully decouple the combustion engine from the gearbox arrangement at the higher rotation rates.

Preferably, in the method, the combustion engine is operable in each of the gearing ratios to deliver its maximum power at substantially a middle portion of the rotation range of the gearing ratio, with the electric machine arrangement providing its maximum towards lower and upper rotation rate limits of the gearing ratio.

Preferably, in the method, the middle portion of the rotation range corresponds to an output shaft of the combustion engine rotating at a rate in a range of substantially 1500 rpm to 3000 rpm, the lower rotation rate corresponds to an output shaft of the electric machine arrangement rotating at a rate in a range of 0 rpm to 1500 rpm, and the upper rotation rate corresponds to the output shaft of the electric machine arrangement rotating at a rate in a range of substantially 3000 rpm to at least 4500 rpm.

According to a third aspect of the invention, there is provided a system including a hybrid powertrain according to the first aspect of the invention.

Preferably, the system is operable to control its hybrid powertrain using a method according to the second aspect of the invention.

Preferably, the system is a bus, a truck, a van, a passenger vehicle, a tram, a train, a boat, a ship, or a stationary power-delivering device.

According to a fourth aspect of the invention, there is provided a computer product executable on computing hardware for implementing a method according to the second aspect of the invention.

According to a fifth aspect of the invention, there is provided a computer product comprising computer program code means adapted to perform a method or for use in a method according to the second aspect of the invention when the computer program is run on a programmable microcomputer.

Preferably, the computer program is adapted to be downloaded to a powertrain according to the first aspect of the invention or one or more of its components when run on a computer which is connected to the Internet.

According to a sixth aspect of the invention, there is provided a computer program product stored on a computer readable medium, comprising computer program code means according to the fifth aspect of the invention.

According to a seventh aspect of the invention, there is provided a hybrid powertrain including:

a combustion engine operable to output rotational power thereat;

an electric machine arrangement, operable to output rotational power thereat;

a gearbox arrangement for receiving rotational power from at least one of the combustion engine and the electric machine arrangement, the gearbox arrangement being operable to couple corresponding motive power to a load;

a control unit arrangement coupled in communication with the combustion engine, with the electric machine arrangement and with the gearbox arrangement for coordinating their operation;

wherein the gearbox arrangement is operable to provide a plurality of gearing ratios;

characterized in that the electric machine arrangement is employable to extend a rotation rate range provided in a given gearing ratio:

(a) at higher rotation rates prior to a gear change from the given gearing ratio to a gearing ratio subsequent thereto; or (b) at both lower rotation rates when accelerating from a standstill or from a preceding gear, and at higher rotation rates prior to a gear change from the given gearing ratio to a gearing ratio subsequent thereto.

According to an eighth aspect of the invention, there is provided a method of controlling a hybrid powertrain including:

a combustion engine operable to output rotational power thereat;

an electric machine arrangement operable to output rotational power thereat;

a gearbox arrangement for receiving rotational power from at least one of the combustion engine and the electric machine arrangement, the gearbox arrangement being operable to couple corresponding motive power to a load;

a control unit arrangement coupled in communication with the combustion engine, with the electric machine arrangement and with the gearbox arrangement for coordinating their operation;

wherein the gearbox arrangement is operable to provide a plurality of gearing ratios, characterized in that the method including steps of:

(a) employing the electric machine arrangement to extend a rotation rate range provided in a given gearing ratio at lower rotation rates when accelerating from a standstill or a preceding gearing ratio, and to extend a rotation rate range provided in the given gearing ratio at higher rotation rates prior to a gear change from the given gearing ratio to a gearing ratio subsequent thereto; or (b) employing the electric machine arrangement to extend a rotation rate range provided in the given gearing ratio at higher rotation rates prior to a gear change from the given gearing ratio to a gearing ratio subsequent thereto.

According to a ninth aspect of the invention, there is provided a method for controlling a hybrid powertrain having an electric machine arrangement operable to output or receive rotational power to/from a load via a gearbox arrangement, comprising the step of controlling the electric machine arrangement in an upper portion of a rotation range provided in a given gearing ratio provided by the gearbox arrangement.

Employing the electric machine arrangement in the upper portion of the rotation range provided in a given gearing ratio creates conditions for extending an available range of rotation rates from a combustion engine in a given gearing ratio. In this way, a frequency of gear changes may be reduced, thereby providing for smoother and more uniform acceleration, and also smoother and more uniform deceleration.

The wording "in an upper portion of the rotation range" corresponds to the wording "at higher rotation rates". More specifically, the method comprises the step of controlling the electric machine arrangement to a rotational power connection to the load in the last portion of the rotation range, advantageously at 50-100% of the rotation range, preferably at 60-100% of the rotation range and especially at 70-100% of the rotation range. Preferably, the method comprises the step of controlling the electric machine arrangement toga rotational power connection to the load at rotation rates above 2000 rpm, especially above 2500 rpm and for example below 6000 rpm.

Preferably, the method comprises the step of controlling the hybrid powertrain so that the electric machine arrangement is the main power source in said upper portion of the rotation range and especially so that the electric machine arrangement is the only power source in said upper portion of the rotation range.

According to one preferred embodiment, the method comprises the step of controlling the electric machine arrangement to output rotational power to the load in said upper portion of the rotation range. Thus, the electric machine arrangement functions as a motor and supplies output rotational power, especially in order to accelerate the load. Preferably, the method comprises the step of controlling the electric machine arrangement to output rotational power to the load in the upper portion of the rotation range provided in the given gearing ratio prior to a gear change from said given gearing ratio to a higher gearing ratio. Thus, the method may comprise an upshifting in the gearbox. Preferably a plurality of consecutive upshifts is performed and the electric machine arrangement is controlled to output rotational power to the load before each upshift in said upper portion of the rotation range.

According to another preferred embodiment, the method comprises the step of controlling the electric machine arrangement to receive rotational power from the load, especially in order to decelerate the load. Preferably, the method comprises the step of controlling the electric machine arrangement to receive rotational power from the load in the upper portion of the rotation range provided in the given gearing ratio following a gear change to said given gearing ratio from a higher gearing ratio. Thus, the method may comprise a downshifting in the gearbox. Preferably a plurality of consecutive downshifts is performed and the electric machine arrangement is controlled to receive rotational power from the load after each downshift in said upper portion of the rotation range. According to one further development, a combustion engine in the hybrid powertrain may be disconnected from the load during the complete deceleration phase. Especially, the method comprises the step of controlling the electric machine arrangement to regeneratively brake the load.

Preferably, in addition to the electric machine arrangement, the hybrid powertrain comprises a further power source operable to output rotational power to the load via the gearbox arrangement. The further power source is constituted by a combustion engine and more particularly a diesel engine, but may alternatively be constituted by a fuel cell, gas turbine or other power source.

Preferably, the method comprises the step of controlling the further power source in a middle portion of the rotation range provided in the given gearing ratio provided by the gearbox arrangement. According to a preferred embodiment, the method comprises the step of controlling the combustion engine to a rotational power connection to the load in the interval 10-90% of the rotation range, preferably in 20-80% of the rotation range and especially in 30-70% of the rotation range. According to a preferred embodiment, the method comprises the step of controlling the combustion engine to a rotational power connection to the load at rotation rates in the range 500-3000 rpm and especially at rotation rates in the range 1000-2500 rpm.

Preferably, the method comprises the step of controlling the further power source to output rotational power to the load in the middle portion of the rotation range, especially in order to accelerate the load.

Preferably, the method comprises the step of controlling the hybrid powertrain so that the further power source is the main power source to output rotational power to the load in the middle portion of the rotation range and especially so that the further power source is the sole power source to output rotational power to the load in the middle portion of the rotation range. The electric machine arrangement may be controlled to give a contribution of output rotational power in said middle portion of the rotation range.

Preferably, the further power source is configured to output a rotational power up to a rotation rate limit in the vicinity of the upper portion of the rotation range and especially, the rotation rate limit is in a vicinity of a maximum speed of the further power source. Preferably, the limit of the upper portion of the rotation range substantially corresponds to the maximum speed of a combustion engine. However, the combustion engine may be able to operate at least partly in the upper portion of the rotation range. Hence, the electric machine and the combustion engine may output a rotational power simultaneously at least during a part of the upper portion of the rotation range. Further, the combustion engine may be configured so that it may deliver output rotational power also in the upper portion of the rotation range, but it is in fact disconnected from the load in the upper portion, and the method comprises solely using the electric machine arrangement in said upper portion.

Preferably, the method comprises the step of at least partially decoupling the further power source from the gearbox arrangement in said upper portion of the rotation range and especially fully decoupling the further power source from the gearbox arrangement in said upper portion of the rotation range. The decoupling procedure is preferably performed by means of a clutch.

Preferably, the further power source is operable in each of the gearing ratios to deliver its maximum power at substantially a middle portion of the rotation range of the gearing ratio, with the electric machine arrangement providing its maximum towards lower and/or upper rotation rate limits of the gearing ratio.

Preferably, the gearbox arrangement is operable to provide a plurality of gearing ratios.

Preferably, the method comprises the step of controlling the electric machine arrangement to a rotational power connection to the load via the gearbox arrangement also in a lower portion of a rotation range provided in a given gearing ratio when accelerating from a standstill or from a preceding gear.

It will be appreciated that features of the invention are susceptible to being combined in any combination without departing from the scope of the invention as defined by the accompanying claims.

DESCRIPTION OF THE DIAGRAMS

Embodiments of the present invention will now be described, by way of example only, with reference to the accompanying drawings wherein.

DETAILED DESCRIPTION

In the following, an embodiment of a hybrid powertrain pursuant to the present invention will be described. Thereafter, operation of the hybrid powertrain will be elucidated. Alternative implementations of the hybrid powertrain will then be described.

While in the following the invention is exemplified in an embodiment of a hybrid powertrain for a vehicle this implies in no way any restriction in regard of the application field of the invention. On the contrary, the invention is usable also in many other application fields as for instance in hybrid powertrains for trains, boats, ships and stationary applications.

Figure 1:
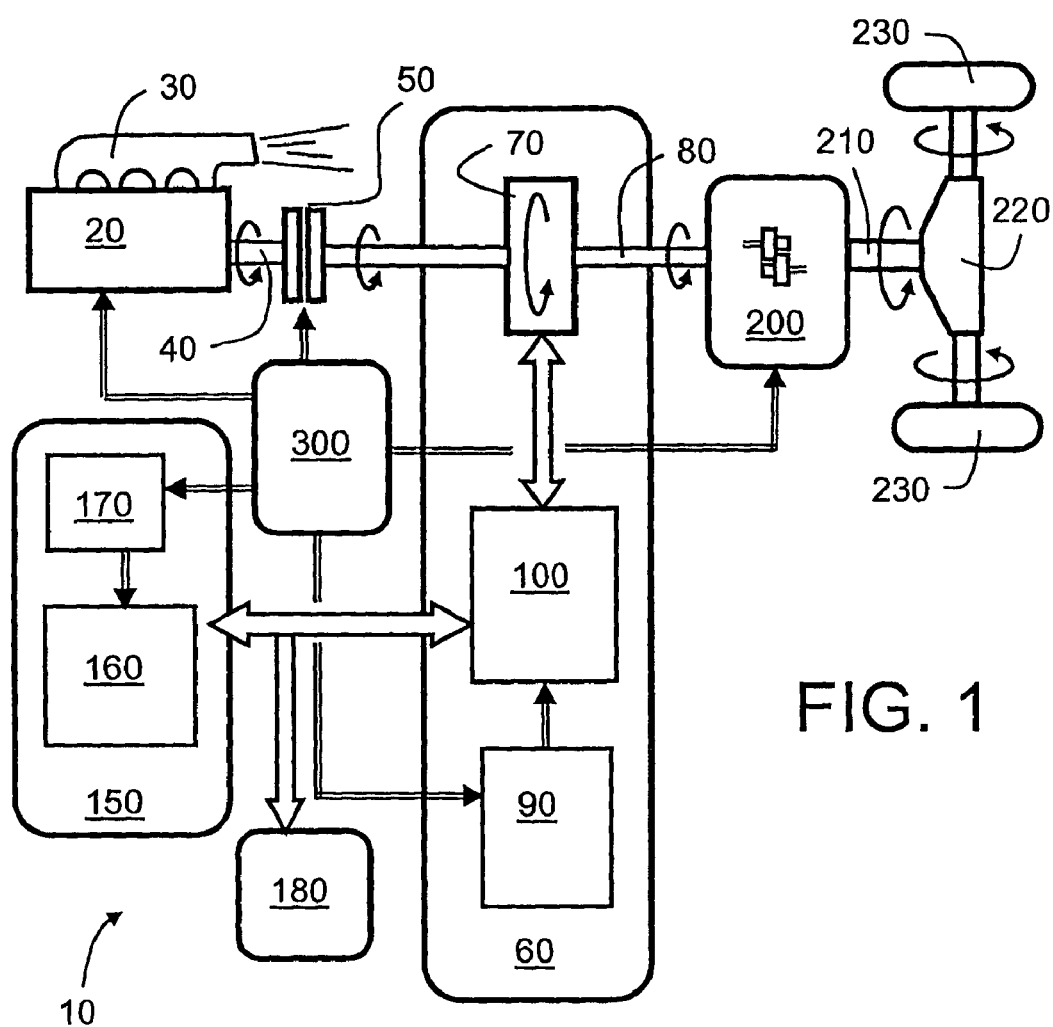
FIG. 1 is a schematic illustration of a hybrid powertrain pursuant to the present invention.

Referring now to FIG. 1, there is illustrated a hybrid powertrain indicated generally by 10. The hybrid powertrain 10 is designed to include relatively few component parts for ensuring enhanced reliability and compactness. Moreover, many of its parts are adaptations of well proven components used in vehicles throughout the world. However, the hybrid powertrain 10 differs from known powertrains in several important aspects which will be elucidated further later.

The powertrain 10 includes a combustion engine 20 with its associated exhaust manifold 30. The engine 20 can either be normally aspirated or turbo-changed. Optionally, the engine 20 is a diesel engine, a biogas engine or a petrol engine. An output crankshaft 40 of the combustion engine 20 is rotationally coupled to a first plate of a clutch 50. A second plate of the clutch 50 is rotationally coupled via a further shaft to an electric machine arrangement 60. The clutch 50 is a slipping-type clutch which provides a torque coupling characteristic; the clutch 50 is continuously adjustable from fully disengaged to fully engaged and degrees of torque coupling therebetween.

The electric machine arrangement 60 includes at least one electric machine 70 which not only is operable to generate rotational mechanical power and thus drive torque when excited by electrical energy, but is also operable to function as a generator when configured to provide regenerative braking and thus braking torque, conveniently, the electric machine 70 is capable of functioning both as a motor and as a generator. The electric machine arrangement 60 further includes an output shaft 80 rotationally coupled to the electric machine 70 and also to the output crankshaft 40 of the combustion engine 20 as illustrated. Additionally, the electric machine arrangement 60 includes an electric machine control unit 90 and a power electronics unit 100 for switching high-current to and from the electric machine 70 in response to it functioning as a drive motor or generator.

The powertrain 10 also includes an energy storage arrangement 150. The energy storage arrangement 150 comprises an energy store element 160 which is optionally implemented as a rechargeable battery electrically coupled to an energy storage element controller 170 for managing discharging and recharging of the energy storage element 160. As alternative, the energy storage element 160 is optionally implemented using nickel metal hydride (NiMH) battery technology, advanced lead acid rechargeable battery technology, lithium ion cell technology, or lithium polymer technology. The use of super-capacitors as energy storage elements 160 is also possible. Alternatively, the energy storage element 160 can be implemented by way of a rotating flywheel energy storage device, a hydraulic storage device, a mechanical energy storage device combined with any suitable energy converting arrangement (not shown) converting:

(i) electrical energy produced by the electric machine 70 (functioning as generator) into an energy form suitable for storage in said energy storage element 160; and (ii) energy stored in said energy storage element 160 into electrical energy for use in the electric machine 70 (functioning as motor).

Yet more optionally, the energy storage element 160 can be implemented as a combination of several such energy storage technologies to best utilize individual charging and discharging characteristics of these technologies.

The powertrain 10 and its vehicle have associated therewith electrical auxiliaries 180, for example one or more of electrical heaters, fans, safety systems and vehicle climate control functions. These electrical auxiliaries 180 are electrically coupled to the energy storage element 160 as illustrated in FIG. 1.

The aforementioned output shaft 80 is rotationally coupled to a gearbox 200. The gearbox 200 is operable to provide several discrete gearing ratios and a neutral coupling from the output shaft 80 to a final out shaft 210. The final output shaft 210 is rotationally coupled via a differential gear 220 to a load 230 of the powertrain 10, for example one or more wheels 230 of a vehicle (not shown) in which the powertrain 10 is mounted. The vehicle is optionally a heavy duty vehicle such as a bus, a truck, a construction vehicle, a delivery van, or any other type of vehicle which is required in operation to exhibit relatively high smooth and uniform acceleration in a stop-start manner of driving. However, the present invention is not limited to such vehicles; for example, the powertrain 10 is susceptible to being employed in passenger vehicles, boats, ships and stationary power-delivery equipment.

The powertrain 10 is additionally provided with a central control unit 300 electrically coupled to an actuator assembly (not shown) associated with the clutch 50, to the electric machine control unit 90, to the energy storage element controller 170, and to an actuator unit (not shown) associated with the gearbox 200. The central control unit 300 is operable to provide an interface to a driver of the vehicle, for example, the central control unit 300 is coupled to receive acceleration, braking and gear-change commands from the driver. Moreover, although not illustrated in FIG. 1, the powertrain 10 includes sensors at various strategic positions in the powertrain 10 for measuring the torque, or measuring parameter signals allowing the subsequent calculation or estimation of the torque; the sensors are beneficially implemented as rotation rate sensors, for example optical or inductive rotation rate sensors implemented as optical or inductive encoders, operable to generate signals; from the signals a measure of torque can be derived from angular acceleration d7dt pursuant to Equation 1 (Eq. 1):

$$T = I\frac{dw}{dt} \qquad \text{Eq. 1}$$

T torque; and

I=moment of inertia.

The central control unit 300 is operable to perform various functions which will be elucidated later concerning interaction of the combustion engine 20, the clutch 50, the electric machine arrangement 60 and the gearbox 200. Optionally, the electric machine arrangement 60 is implemented by one or more: switched reluctance technology, induction motor/generator technology, permanent magnet technology.

Operation of the powertrain 10 will now be described with reference to FIG. 1. The control unit 300 is programmed to activate the combustion engine 20 periodically so as to operate it at a most efficient part of its thermal operating regime so as to enable the combustion engine 20 to provide enhanced fuel economy for the powertrain 10. There are therefore periods during which the combustion engine 20 is in a deactivated state without fuel being supplied thereto. When the combustion engine 20 is in the deactivated state, the clutch 50 is beneficially actuated by the control unit 300 to be in a disengaged state. As described earlier, the clutch 50 is at least partially engaged to couple torque from the combustion engine 20 when the engine 20 is in its activated state with fuel supplied thereto. The control unit 300 is programmed to control the operation of the electric machine arrangement 60, the clutch 50 and the combustion engine 20 so that deactivation and activation of the combustion engine 20 occurs in the powertrain 10 without substantially inducing any noticeable jerks. Such a characteristic is especially important when the powertrain 10 is employed in a bus which transports in operation passengers in a standing position, the bus being required to accelerate smoothly and rapidly in urban environments so as not to unduly impede traffic flow and yet be as fuel efficient as possible to meet economic and fuel emission constraints.

Figure 2:
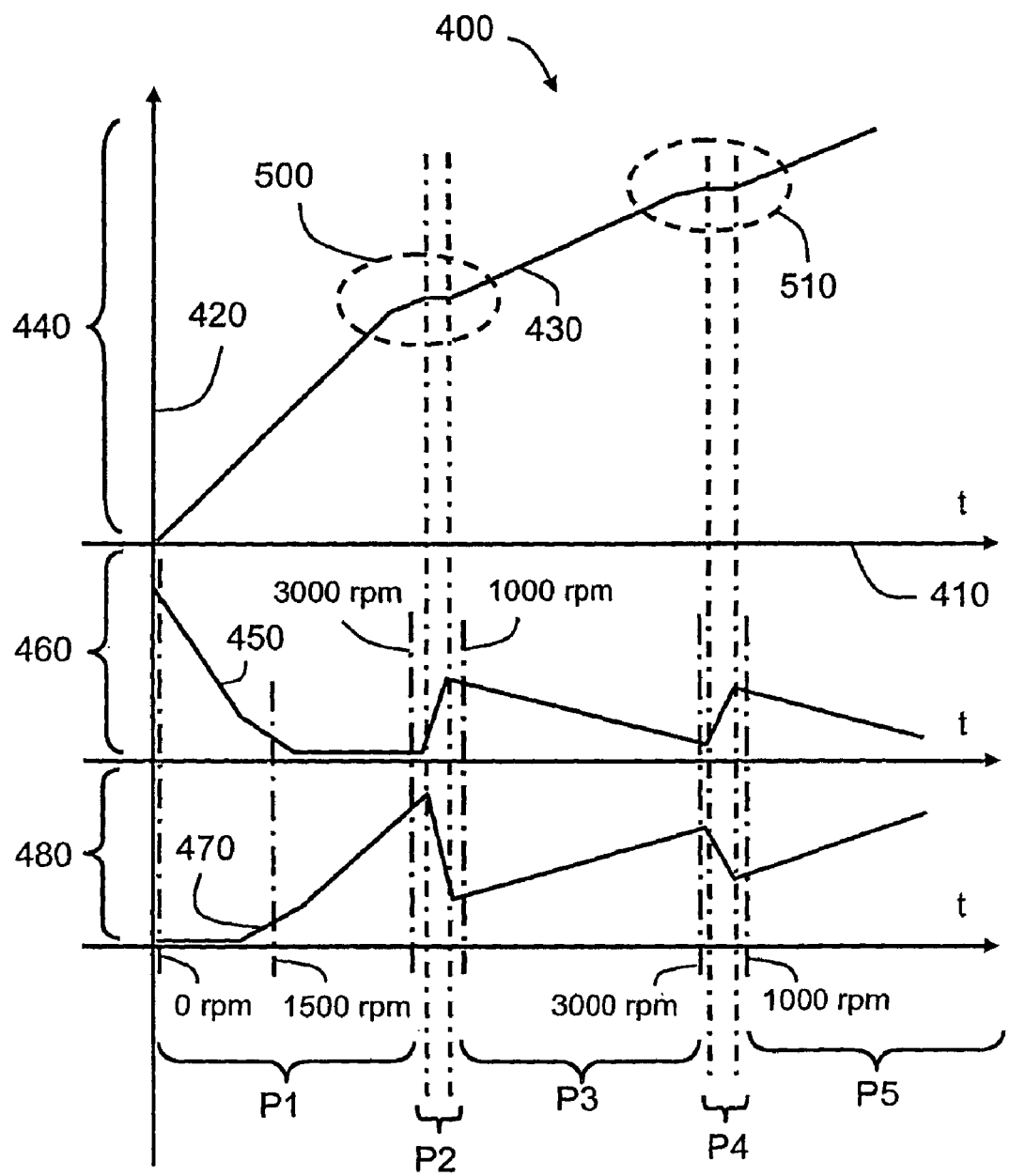
FIG. 2 is a graph illustrating acceleration of a vehicle including the hybrid powertrain of FIG. 1, the powertrain operating in a conventional contemporary manner.

Conventional contemporary operation of the powertrain 10 will now be described with reference to FIG. 2. In FIG. 2, there is shown a first graph indicated generally by 400. The first graph 400 includes an abscissa axis 410 denoting elapsed time from left to right. Moreover, the first graph 400 includes an ordinate axis 420 subdivided into first, second and third regions 440, 460, 480. In the first region 440 the ordinate axis 420 denotes increasing vehicle speed from bottom to top. In the second region 460, the ordinate axis 420 denotes motive power delivered from the electric machine 70 with power increasing from bottom to top. In the third region 480, the ordinate axis 420 denotes motive power delivered from the combustion engine 20 via the clutch 50 with power increasing from bottom to top. Acceleration of the vehicle is shown as a sequence of phases commencing with phase P1 and ending with phase P5; there are further phases beyond phase P5 which are not described. In a process of progressing from the phase P1 to the phase P5, the speed of the vehicle follows a curve 430 included in the first region 440, power delivered from the electric machine 70 follows a curve 450 in the second region 460, and power delivered from the combustion engine 20 follows a curve 470 in the third region 480. The phases P1, P3 and P5 correspond to acceleration of the vehicle. In an example, in the phase P1, the electric machine 70 is operable to provide a majority of mechanical power and torque from a shaft revolution rate of 1000 rpm to 1500 rpm whereat the combustion engine 20 provides a majority of mechanical power and torque from a shaft revolution rate of 1500 rpm to 3000 rpm; similar consideration regarding mechanical power load sharing between the electric machine 70 and the combustion engine 20 also substantially pertains to phases P3 and P5. The phases P2 and P4 correspond to gear changes occurring in the gearbox 200. The first graph 400 corresponds substantially to a regime adopted in the aforementioned published international PCT application no. WO2005/016681.

At a time just prior to the phase P1, the vehicle including the hybrid powertrain 10 is stationary. During the phase P1, initial acceleration occurs using power delivered substantially from the electric machine 70 to a threshold speed whereat the combustion engine 20 progressively delivers more power relative to the electric machine 70; at the end of the phase P1, motive power to accelerate the vehicle is provided substantially from the combustion engine 20. During the phase P2, a gear change occurs wherein the electric machine 70 is again used at the commencement of the phase P3 to provide motive force in cooperation with the electric machine 70 with the combustion engine 20 again assuming a function of delivering most motive power at an end of the phase P3 just proceeding a gear change in the phase P4. At the commencement of the phase P5, the combustion engine 20 delivers relatively more motive power than the electric machine 70; during the phase P5, the combustion engine 20 increasingly delivers more motive power as power delivered from the electric machine 70 is progressively decreased. Beyond the phase P5, the combustion engine 20 is progressively more used to provide motive power to an extent that the electric machine 70 has a relatively subordinate contribution. Gear changes at the phases P2 and P4 gives rise to abrupt changes in acceleration denoted by 500 and 510 respectively which can be felt as acceleration jerks by passengers traveling in the vehicle, for example a bus.

In order to further elucidate operation of the powertrain 10 in a conventional manner, some example parameters pertaining to a practical implementation of the powertrain 10 will now be described.

The electric machine 70 is beneficially a six-phase permanent-magnet (PM) synchronous motor which is operable to generate 120 kW of mechanical power and generate a maximum torque of 800 Nm. Moreover, although the electric machine 70 develops its greatest torque at lower rotation speeds, its rotor is capable of being driven at rotation rates from standstill to substantially 8000 rpm.

The gearbox 200 is beneficially an automatic proprietary Volvo I-shift gearbox; alternatively, the gearbox 200 is a custom-designed gearbox adapted for use with the powertrain 10. For example, the gearbox 200 includes in a range of six to twelve gears which are individually selectable from the control unit 300; more normally, the gearbox 200 includes substantially ten gears. Such an implementation of the gearbox enables the combustion engine 20 to propel a vehicle into which the powertrain 10 is mounted in a speed range of 0 km/h to 150 km/h. Thus, when accelerating the vehicle from standstill to a speed in an order of 80 km/h, the gearbox 200 conventional has to be shifted through in an order of five to six gears, Discontinuities in power transmitted through the gearbox 200 potentially occur at each gear shift occurring in the gearbox 200 when the electric machine 70 and combustion engine 20 are momentarily decoupled from the gearbox 200 during operation of the powertrain 10.

Figure 3:
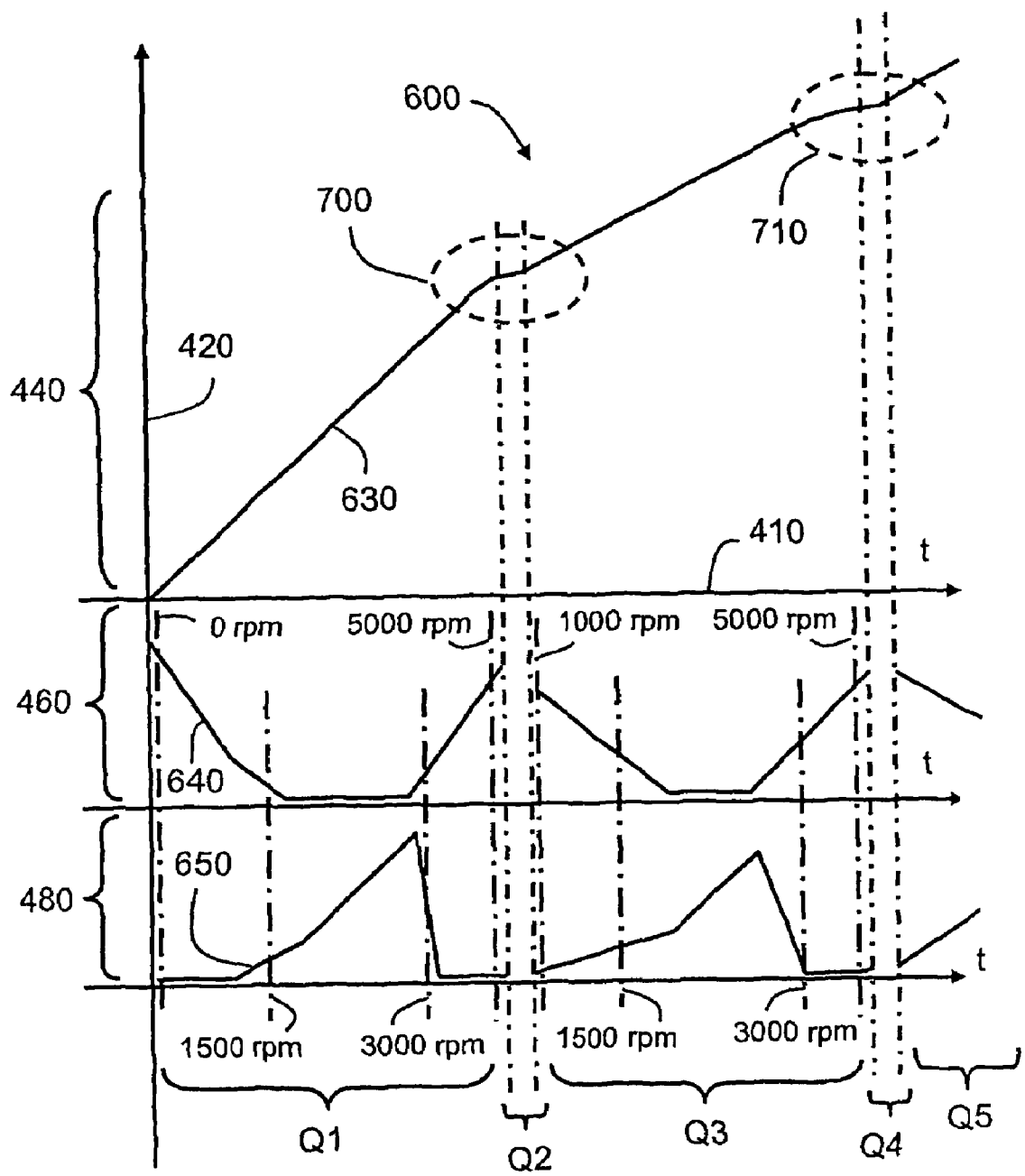
FIG. 3 is a graph illustrating acceleration of the vehicle including the hybrid powertrain of FIG. 1, the powertrain operating in a manner pursuant to the present invention.

The inventor has appreciated that operation of the hybrid powertrain 10 can be improved to provide a more uniform and smooth acceleration than that illustrated in FIG. 2. The hybrid powertrain 10 is beneficially operated pursuant to the present invention, namely in a manner as illustrated in FIG. 3. Referring to FIG. 3, there is shown a second graph indicated generally by 600. The second graph 600 includes the aforementioned abscissa axis 410 denoting a passage of time r from left to right. Moreover, the ordinate axis 420 of the second graph 600 includes the aforementioned first, second and third regions 440, 460 and 480 respectively. A curve 630 in the first region 440 of the second graph 600 represents speed of the vehicle including the hybrid powertrain 10. A curve 640 of the second graph 600 corresponds to motive power provided from the electric machine 70; for example, the electric machine 70 is operable to deliver its mechanical power over a shaft rotation rate range of 1000 rpm to approaching 6000 rpm when its associated vehicle is already in motion, and optionally from substantially 0 rpm to approaching 6000 rpm when the vehicle is being launched from stand-still. A curve 650 of the second graph 600 corresponds to motive power provided from the engine 20; for example, the combustion engine 20 is operable to deliver its mechanical power over a shaft rotation rate range of 1500 rpm to 3000 rpm, although the combustion engine 20 is capable of being operated at rotation rate ranges below 1500 rpm and above 3000 rpm when forced to do so in an idling manner by the electric machine 70. The second graph 600 corresponds to the vehicle accelerating progressively from a phase Q1 to a phase Q5. Phases Q2 and Q4 correspond to gear changes occurring in the gearbox 200. However, in comparison to the first graph 400 of FIG. 2, the second graph 600 of FIG. 3 shows from the curve 630 a greater attainable vehicle speed for each gear during the phases Q1, Q3 and Q5, thereby requiring relatively less frequent gear changes, hence saving wear of the gearbox 200 and the clutch 50 and providing a smoother and more uniform acceleration than provided in the first graph 400. Thus, in the second graph 600, a greater speed range is achievable in the phases Q1, Q3 and Q5 by exploiting a characteristic that the electric machine 70 is susceptible to function over a greater rotation rate range in comparison to the combustion engine 20; optionally, the gearbox 200 is designed to include fewer gear ranges which are more mutually spaced apart with regard to their gearing ratios, thereby simplifying mechanical design of the gearbox 200 and thereby potentially reducing its manufacturing cost and increasing its operating reliability.

Optionally, for thermal operating efficiency optimization, the combustion engine 20 optionally has a reduced rotation rate range than a conventional combustion engine not intended for use in a hybrid powertrain; for example the combustion engine 20 can be of tuned design and optionally utilizes a tuned inlet manifold. If necessary, the electric machine 70 is optionally upgraded to a more powerful unit when operating pursuant to FIG. 3. Thus, an important feature in FIG. 3 is that the excitation to the electric machine 70 is increased substantially prior to a gear change so as to extend the phases Q3, Q5 and especially Q1. In consequence, as denoted by the curve 650, the combustion engine 20 is operable to deliver most power substantially in a middle portion of the phases Q1, Q3 and Q5. To avoid over-rewing the combustion engine 20, the clutch 50 is optionally disengaged to isolate the combustion engine 20 at latter portions of the phases Q1, Q3 and Q5, in which case motive power to accelerate the vehicle is derived solely from the electric machine 70 immediately prior to a gear change. Such a mode of operation is in contradistinction to conventional practice wherein the combustion engine 20 is regarded as being most appropriate for delivering motive power at latter regions of the phases P1, P3 and P5 just prior to gear changes as illustrated in FIG. 2. Whilst the clutch 50 is used to isolate the combustion engine 20, the combustion engine 20 can optionally be deactivated; alternatively, the combustion engine 20 can be maintained active when isolated by the clutch 50.

Thus in FIG. 3, the electric machine 70 provides a majority of motive power at initial start and around gear changes; for example, the electric machine 70 is arranged to deliver a majority of its motive power in a lower shaft rotation rate range of 1000 rpm to 1500 rpm and also at a higher shaft rotation rate range of 3000 to approaching 6000 rpm respectively, for example approaching at least 4500 rpm; the lower shaft rotation rate range of 0 rpm to 1500 rpm is optionally appropriate when a vehicle is being launched into motion. In FIG. 3, the engine 20 is employed to provide most motive power in intermediate regions between gear changes; for example, the engine 20 is arranged deliver a majority of its motive power in a rotation rate range of substantially 1500 rpm to 3000 rpm. Although FIG. 3 illustrates acceleration of the vehicle, a similar approach can also be adopted when decelerating the vehicle to reduce a number of gear changes involved; during deceleration, the combustion engine 20 remains decoupled during intermediate regions of gear settings. For example, in an urban stop-start situation, it is feasible for the vehicle configured pursuant to the present invention to be operated solely in the phase Q1 without a gear change being necessary; in comparison, operating the vehicle according to the first graph 400 would require a gear change in the phase P2 to be required cause the phase P3 to be invoked, the gear change at the phase P2 causing a momentary interruption of motive power for the vehicle and hence acceleration jerks felt by passengers of the vehicle. Operating the powertrain 10 pursuant to the second graph 600 results in less disturbance at regions 700, 710 associated with gear changes at the phases Q2 and Q4 respectively. Moreover, as elucidated earlier, the invention beneficially enables a simpler design of gearbox 200 with fewer gear, ranges which is susceptible to reducing manufacturing cost and enhancing operating reliability.

Operation of the vehicle including the powertrain 10 in a manner depicted in FIG. 3 is achieved by appropriately programming the central control unit 300. The central control unit 300 is, for example, operable to control a manner in which a distribution of mechanical power to be delivered from the electric machine 70 relative to the combustion engine 20 as a function of shaft revolution rate for implementing the present invention, for example as illustrated in FIG. 3. Software for executing in the central control unit 300 is conveyable thereto on a data carrier, for example on a plug-in read-only-memory (ROM) module which is connectable to a connector of the control unit 300. Alternatively, or additionally, the control unit 300 includes a data communication link, for example a wireless link such as a Blue Tooth wireless link or a cell-phone link, so that executable software is conveyable on a wireless carrier signal to the data communication link for storage of the executable software in a data memory of the control unit 300 for subsequent execution therein. Optionally, the central control unit 300 is connectable via a data link, for example a wireless data link, to a communication network such as the Internet for downloading one or more software products therefrom. In particular, when the central control unit 300 is implemented as computing hardware operable to execute software, the powertrain 10 is optionally configurable to be selectively switchable between the graphs 400, 600 or any intermediate characteristic therebetween.

In FIG. 3, the electric machine 70 is illustrated as providing relatively most mechanical power at a shaft rotation rate up to substantially 1500 rpm, the combustion engine 20 providing relatively most mechanical power at a shaft rotation rate in a range of substantially 1500 rpm to 3000 rpm, and the electric machine 70 providing relatively most mechanical power at a shaft rotation rate in a range of 3000 rpm to 5000 rpm. However, depending upon size and design of the electric machine 70 and the combustion engine 20, these ranges can be varied somewhat. For example, when the combustion engine 20 is relatively small, the engine 20 can potentially be operated with its power band extending above 3000 rpm, for example to 3500 rpm. Conversely, for example, when the combustion engine 20 is relatively large, for example a 10 liter engine-capacity diesel engine, the engine 20 potentially has a power band extending from 1000 rpm upwards to around 2500 rpm; in such a situation, the electric machine 70 is beneficially arranged to deliver its mechanical power in a shaft rotation rate range of substantially 500 rpm to 1000 rpm, and in a shaft rotation rate range of substantially 2500 rpm to 4000 rpm. Other variations in such rotation rate ranges are possible and are within the scope of the present invention as defined by the appended claims.

For example, the central control unit 300 is optionally programmed in such a way that the operation of the hybrid powertrain implemented in a truck or bus or any other vehicle is switchable between an "urban driving" setting using the method according to the invention and a "conventional mode" setting (for instance used when driving the vehicle on the motor highway). However, the graph 600 represents an improved situation for achieving a smoother and more uniform acceleration in the vehicle. Optionally, the central control unit 300 is automatically switchable in response to wireless signals received thereat to switch between such an "urban driving" setting and such a "conventional mode" setting. Such automatic switching between settings is potentially capable of reducing an information processing workload presented to a driver of the vehicle.

Although embodiments of the present invention have been described in the foregoing in respect acceleration of a load, for example for accelerating a vehicle such as a bus, the invention is also pertinent to regenerative braking and deceleration of the load. By employing the electric machine arrangement 60 at higher rotation rates immediately after when changing down a gear, a number of gear changes required when decelerating the load can also be reduced. Thus, rotation ranges associated with gears in a transmission are thereby susceptible to being extended by application of the present invention.

Although the present invention has been described in the foregoing in respect of the powertrain 10, it will be appreciated that the present invention is not limited to use in such a configuration and can be adapted for use with other configurations of powertrain. Modifications to embodiments of the invention described in the foregoing are thus possible without departing from the scope of the invention as defined by the accompanying claims.

Although use of the powertrain 10 has been described in the foregoing in respect of vehicles, for example buses and trucks, it will be appreciated that it can be employed also in other types of systems, for example passenger vehicles, trams, trains, boats, ships and stationary power-delivery systems.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural.

Numerals included within parentheses in the accompanying claims are intended to assist understanding of the claims and should not be construed in any way to limit subject matter claimed by these claims.

The invention claimed is:

1. A hybrid powertrain including:
   a combustion engine operable to output rotational power thereat;
   an electric machine arrangement, operable to output rotational power thereat;
   a gearbox arrangement for receiving rotational power from at least one of the combustion engine and the electric machine arrangement, the gearbox arrangement being operable to couple corresponding motive power to a load;
   a control unit arrangement coupled in communication with the combustion engine, with the electric machine arrangement and with the gearbox arrangement for coordinating their operation;
   wherein the gearbox arrangement is operable to provide a plurality of gearing ratios;
   wherein
   the electric machine arrangement is employable to extend a rotation rate range provided in a given gearing ratio at higher rotation rates prior to a gear change from the given gearing ratio to a gearing ratio subsequent thereto.

2. A hybrid powertrain as claimed in claim 1, wherein the electric machine arrangement is also employable to extend a rotation rate range provided in a given gearing ratio at both lower rotation rates when accelerating from a standstill or from a preceding gear.

3. A powertrain as claimed in claim 1, wherein a coupling arrangement included in the powertrain is operable to at least partially decouple the combustion engine from the gearbox arrangement at the higher rotation rates.

4. A powertrain as claimed in claim 3, wherein the coupling arrangement is operable to fully decouple the combustion engine from the gearbox arrangement at the higher rotation rates.

5. A powertrain as claimed in claim 1, wherein the combustion engine is operable in each of the gearing ratios to deliver its maximum power at substantially a middle portion of the rotation range of the gearing ratio, with the electric machine arrangement providing its maximum towards lower and upper rotation rate limits of the gearing ratio.

6. A powertrain as claimed in claim 5, wherein the middle portion of the rotation range corresponds to an output shaft of the combustion engine rotating at rate in a range of substantially 1500 rpm to 3000 rpm, the lower rotation rate corresponds to an output shaft of the electric machine arrangement rotating at a rate in a range of 0 rpm to 1500 rpm, and the upper rotation rate corresponds to the output shaft of the electric machine arrangement rotating at a rate in a range of substantially 3000 rpm to at least 4500 rpm.

7. A system including a hybrid powertrain as claimed in claim 1.

8. A system as claimed in claim 7, the system being operable to control its hybrid powertrain using a method as of controlling a hybrid powertrain, the powertrain including;
   a combustion engine operable to output rotational power thereat;
   an electric machine arrangement operable to output rotational power thereat;
   a gearbox arrangement for receiving rotational power from at least one of the combustion engine and the electric machine arrangement, the gearbox arrangement being operable to couple corresponding motive power to a load;
   a control unit arrangement coupled in communication with the combustion engine, with the electric machine, and with the gearbox arrangement for coordinating their operation;
   wherein the gearbox arrangement is operable to provide a plurality of gearing ratios
   the method including;
   (a) employing the electric machine arrangement to extend a rotation rate range provided in a given gearing ratio at lower rotation rates when accelerating from a standstill or a preceding gearing ratio, and to extend a rotation rate range provided in the given gearing ratio at higher rotation rates prior to a gear change from the given gearing ratio to a nearing ratio subsequent thereto; or
   (b) employing the electric machine arrangement to extend a rotation rate range provided in the given gear ratio at higher rotation rates prior to a gear change from the given gearing ratio to a gearing ratio subsequent thereto.

9. A system as claimed in claim 7, wherein the system is a bus, a truck, a van, a passenger vehicle, a tram, a train, a boat, a ship, or a stationary power-delivering device.

10. A hybrid powertrain including,
    a combustion engine operable to output rotational power thereat;
    an electric machine arrangement, operable to output rotational power thereat;

a gearbox arrangement for receiving rotational power from at least one of the combustion engine and the electric machine arrangement, the gearbox arrangement being operable to couple corresponding motive power to a load;

a control unit arrangement coupled in communication with the combustion engine, with the electric machine arrangement and with the gearbox arrangement for coordinating their operation;

wherein the gearbox arrangement is operable! to provide a plurality of gearing ratios;

wherein the electric machine arrangement is employable to extend a rotation rate range provided in a subsequent gearing ratio at higher rotation rates after a gear change from a given gearing ratio to the gearing ratio subsequent thereto.

11. A method of controlling a hybrid powertrain including:
a combustion engine operable to output rotational power thereat;
an electric machine arrangement operable to output rotational power thereat:
a gearbox arrangement for receiving rotational power from at least one of the combustion engine and the electric machine arrangement, the gearbox arrangement being operable to couple corresponding motive power to a load;
a control unit arrangement coupled in communication with the combustion engine, with the electric machine arrangement and with the gearbox arrangement for coordinating their operation;
wherein the gearbox arrangement is operable to provide a plurality of gearing ratios,
wherein
the method including:
(a) employing the electric machine arrangement to extend a rotation rate range provided in a given gearing ratio at lower rotation rates when accelerating from a standstill or a preceding gearing ratio, and to extend a rotation rate range provided in the given gearing ratio at higher rotation rates prior to a gear change from the given gearing ratio to a gearing ratio subsequent thereto; or
(b) employing the electric machine arrangement to extend a rotation rate range provided in the given gearing ratio at higher ration rates prior to a gear change from the given gearing ratio to a gearing ratio subsequent thereto.

12. A method as claimed in claim 11, including using a coupling arrangement to at least partially decouple the combustion engine from the gearbox arrangement at the higher rotation rates.

13. A method as claimed claim 12, wherein the coupling arrangement is operable to fully decouple the combustion engine from the gearbox arrangement at the higher rotation rates.

14. A method as claimed in claim 11, wherein the combustion engine is operable in each of the gearing ratios to deliver its maximum power at substantially a middle portion of the rotation range of the gearing ratio, with the electric machine arrangement providing its maximum towards lower and upper rotation rate limits of the gearing ratio.

15. A method as claimed in claim 14, wherein the middle portion of the rotation range corresponds to an output shaft of the combustion engine rotating at a rate in a range of substantially 1500 rpm to 3000 rpm, the lower rotation rate corresponds to an output shaft of the electric machine arrangement rotating at a rate in a range of 0 rpm to 1500 rpm, and the upper rotation rate corresponds to the output shaft of the electric machine arrangement rotating at a rate in a range of substantially 3000 rpm to at least 4500 rpm.

16. A computer product executable on computing hardware for implementing a method as claimed in claim 11.

17. A computer product comprising computer program code means adapted to perform a method or for use in a method according to claim 11 when the computer program is run on a programmable microcomputer.

18. A computer program according to claim 17 adapted to be downloaded to a powertrain when run on a computer which is connected to the internet.

19. A computer program product stored on a computer readable medium, comprising computer program code means according to claim 17.

20. A method of controlling a hybrid powertrain including:
a combustion engine operable to output rotational power thereat;
an electric machine arrangement operable to output rotational power thereat;
a gearbox arrangement for receiving rotation a power from at least one of the combustion engine and the electric machine arrangement, the gearbox arrangement being operable to couple corresponding motive power to a load;
a control unit arrangement coupled in communication with the combustion engine, with the electric machine arrangement and with the gearbox arrangement for coordinating their operation;
wherein the gearbox arrangement is operable to provide a plurality of gearing ratios,
wherein
the method including:
(a) employing the electric machine arrangement to extend a rotation rate range provided in a given gearing ratio at lower rotation rates when accelerating from a standstill or a preceding gearing ratio, and to extend a rotation rate range provided in the given gearing ratio at higher rotation rates prior to a gear change from the given gearing ratio to a gearing ratio subsequent thereto; or
(b) employing the electric machine arrangement to extend a rotation rate range provided in a subsequent gearing ratio at higher rotation rates after a gear change from a given gearing ratio to the gearing ratio subsequent thereto.

21. A method for controlling a hybrid powertrain having an electric machine arrangement operable to output or receive rotational power to/from a load via a gearbox arrangement and a further power source operable to output rotational power to the load via the gearbox arrangement, comprising controlling the further power source in middle portion of a rotation range provided in a given gearing ratio provided by the gearbox arrangement and controlling the electric machine arrangement in an upper portion of the rotation rang provided in the given gearing ratio provided by the gearbox arrangement.

22. A method according to claim 21, comprising controlling the hybrid powertrain so that the electric machine arrangement is the main power source in the upper portion of the rotation range.

23. A method according to claim 21, comprising controlling the hybrid powertrain so that the electric machine arrangement is the only power source in the upper portion of the rotation range.

24. A method according to claim 21, comprising controlling the electric machine arrangement to output rotational power to the load in aid upper portion of the rotation range.

25. A method according to claim 21, comprising controlling the electric machine arrangement to output rotational power to the load in aid upper portion of the rotation range in order to accelerate the load.

26. A method according to claim 24, comprising controlling the electric machine arrangement to output rotational power to the load in the upper portion of the rotation range provided in the given gearing ratio prior to a gear change from the given gearing ration to a higher gearing ratio.

27. A method according to claim 21, comprising controlling the electric machine arrangement to receive rotational power from the load.

28. A method according to claim 21, comprising controlling the electric machine arrangement to receive rotational power from the load in the upper portion of the rotation range in order to decelerate the load.

29. A method according to claim 27, comprising controlling the electric machine arrangement to receive rotational power from the load in the upper portion of the rotation range provided in the given gearing ratio following a gear change to the given gearing ratio from a higher gearing ratio.

30. A method according to claim 27, comprising controlling the electric machine arrangement to regeneratively brake the load.

31. A method according to claim 21, wherein the further power source is constituted by a combustion engine.

32. A method according to claim 21, comprising controlling the further power source to output rotational power to the load in the middle portion of the rotation range.

33. A method according to claim 21, comprising controlling the hybrid powertrain so that the further power source is the main power source to output rotational power to the load in the middle portion of the rotation range.

34. A method according to claim 21, comprising controlling the hybrid powertrain so that the further power source is the sole power source to output rotational power to the load in the middle portion of the rotation range.

35. A method according to claim 21, comprising controlling the further power source to output rotational power to the load in the middle portion of the rotation range in order to accelerate the load.

36. A method according to claim 21, wherein the further power source is configured to output a rotational power up to a rotation rate limit in the vicinity of the upper portion of the rotation range.

37. A method according to claim 36, wherein the rotation rate limit is in a vicinity of a maximum speed of the further power source.

38. A method according to claim 21, comprising at least partially decoupling the further power source from the gearbox arrangement in the upper portion of the rotation range.

39. A method according to claim 21, comprising fully decoupling the further power source from the gearbox arrangement in the upper portion of the rotation range.

40. A method according to claim 21, wherein the further power source is operable in each of the gearing ratios to deliver its maximum power at substantially a middle portion of the rotation range of the gearing ratio, with the electric machine arrangement providing its maximum towards lower and/or upper rotation rate limits of the gearing ratio.

41. A method according to claim 21, wherein the gearbox arrangement is operable to provide a plurality of gearing ratios.

42. A method according to claim 21, comprising controlling the electric machine arrangement to a rotational power connection to the load via the gearbox arrangement also in a lower portion of a rotation range provided in a given gearing ratio when accelerating from a standstill or from a preceding gear.

* * * * *